United States Patent Office 3,577,374
Patented May 4, 1971

3,577,374
COATING COMPOSITIONS COMPRISING
POLYVINYL ACETAL
Robert A. Isaksen, Longmeadow, Mass., assignor to
Monsanto Company, St. Louis, Mo.
No Drawing. Continuation-in-part of application Ser. No. 624,702, Mar. 21, 1967. This application Dec. 26, 1968, Ser. No. 787,251
Int. Cl. C09d 3/74, 5/08, 5/10
U.S. Cl. 260—23                                     11 Claims

ABSTRACT OF THE DISCLOSURE

Disclosed herein is a coating composition for application to various surfaces particularly wood or metal. When applied to metal, it is not necessary that the metal be previously cleaned of oxidation products and/or greasy, oily contaminants. The coating is based upon a blend of polyvinyl acetal and a styrene-alcohol interpolymer, such as styrene-allyl alcohol interpolymer, and/or esters and/or ester adducts thereof. Optionally, the coating may also contain chromium trioxide and/or aluminum powder.

REFERENCE TO RELATED APPLICATION

This is a continuation-in-part of copending application Ser. No. 624,702, filed Mar. 21, 1967, and now abandoned.

BACKGROUND OF THE INVENTION

(1) Field of the invention

This invention relates to coating compositions for application to various surfaces, e.g., wood or metal. In particular, these coatings greatly improve the resistance to corrosion of underlying metal substrates and further may, if desired, be applied to surfaces which have not undergone a prior cleaning step.

(2) Description of the prior art

Steel and other plate for use in ship and outdoor construction have, in the past, usually been coated with wash primers and anti-corrosive primers to protect the metal from corrosion during storage prior to use. These anti-corrosive primers afforded excellent protection but presented a drawback in that they had to be removed before any welding could be done for fabrication into a finished article. There was recognized a need in the industry for a shop-coat primer which would protect metal plate and which would not need to be removed before welding, priming and top coating the metal. Such a coating has been disclosed in U.S. 3,325,432 relating to a primer comprising a solution of polyvinyl butyral with chromium trioxide, aluminum powder and water. While this formulation has exhibited good exterior durability, its corrosion resistance, moisture resistance and adhesion, particularly to uncleaned steel, has been marginal. In particular, preparation of the substrate, usually by shot-blasting to white metal, has been necessary for adequate protection. A need has therefore existed for some time for a coating which could be applied to a metal substrate which has undergone little or no prior preparation for the removal of oily or greasy contaminants. In addition to this, a need has also existed for a coating composition which could be successfully applied and used on a wide variety of surfaces other than metals, e.g., wood, ceramic, plastic, etc., with only moderate modification, for example, variation is pigmentation.

SUMMARY OF THE INVENTION

This invention relates to coating compositions which may be applied to metal plate, wood, ceramics, plastics and the like.

As is well known, when steel or other metals emerge from the rolling mill, they are covered with gerasy or oily substances which serve to reduce damage brought about by friction and also to retard the onset of oxidation. Previously, in order to improve the bond between the metallic substrate and any coating to be applied thereto, it has been necessary to remove such surface contaminants by various means such as chemical degreasing, sandblasting, wire brushing, etc. Further, despite the use of these oily or greasy coatings, it often happens that rusting, i.e. oxidation, does occur whereupon such rust must also be removed prior to further coating. Now, however, using the formulations of the present invention, these difficult and expensive cleaning operations to remove grease or rust may be partially or entirely dispensed with, without sacrificing adequate bonding. Further, it has been found that the corrosion protection afforded by the coatings of this invention is much superior to that of the coatings of the prior art.

More particularly, this invention relates to a coating composition comprising a polymeric blend comprising:

(A) about 5 to about 95% by weight of at least one polyvinyl acetal, and, correspondingly, (B) about 95 to about 5% by weight of an interpolymer selected from the group consisting of:

(1) an interpolymer having at least one alcoholic-hydroxyl-containing residue and a styrene residue selected from the group consisting of styrene, substituted styrenes and mixtures thereof, (2) an unsaturated ester of the interpolymer of part (1) with at least one unsaturated mono- or poly-carboxylic acid, (3) an adduct of the ester of part (2) with at least one alpha, beta-ethylenically unsaturated carboxylic compound and (4) mixtures thereof.

By "residue" is meant that which remains of a molecule after the removal of a portion of its constituents, i.e., an atom or group regarded as a portion of a molecule.

The compositions of this invention are useful for a wide variety of coating applications. In particular it has been found that they are especially useful for application to metal surfaces which are subsequently to be welded. Where such a use is contemplated it will be found advantageous to include as a further component of the coating composition an aluminum powder of finer than 100 mesh. It will also be advantageous to include chromium trioxide mixed with water to form chromic acid. It will be particularly advantageous to employ about 10% to about 50% by weight of the aluminum powder, based upon the weight of the total resin and about 0.5% to about 3% by weight chromium trioxide based upon the amount of the polyvinyl acetal.

This invention also relates to a process for preparing the above described weldable, anti-corrosive coating composition, which process comprises:

(A) dissolving the components of the polymeric blend, under agitation, in at least one non-corrosive organic liquid which is a solvent for both components of the blend, (B) dissolving chromium trioxide in water in a separate vessel, (C) adding the chromium trioxide solution to the resin solution slowly under good agitation, and then (D) adding the aluminum powder.

Prior to the addition of the chromic acid solution to the resin solution, additional solvents, e.g. acetone, methyl ethyl ketone, alcohols and the like may, if desired, be added to the chromic acid solution.

By "good agitation" is meant agitation sufficient to prevent high localized concentrations which can lead to gelling.

If it is desired to add other components such as driers, extenders, fillers, pigments, etc., this may be done at any time after the chromium trioxide solution has been added to the resin solution.

It is therefore an object of this invention to provide a coating composition applicable to a wide variety of surfaces.

It is an object of this invention to provide a coating composition having excellent adhesion to metal surfaces.

It is a further object of this invention to provide a coating composition for application to metal surfaces which will or which may be formulated to protect these surfaces from corrosion.

It is still another object of this invention to provide a weldable, anticorrosive coating for metal which does not require removal before welding.

It is a further object of this invention to provide a weldable, anticorrosive coating for metals which have not undergone prior cleaning steps to remove the products of oxidation or greasy or oily contaminants.

Another object of this invention is to provide a weldable, anticorrosive coating for metal which need not be removed before additional coating of the metal.

Another object of this invention is to provide a method for preparing an weldable anti-corrosive coating for metals which does not require removal before welding, priming and/or top coating, and which may be applied to surfaces which have not undergone a prior cleaning step.

DESCRIPTION OF THE PREFERRED EMBODIMENTS

As employed herein, the term "polyvinyl acetal" is intended to be used in a generic sense meaning the reaction product under acidic conditions of polyvinyl alcohol (i.e. an at least partially hydrolyzed polyvinyl ester) with at least one aldehyde and not in the specific sense of solely the reaction product of polyvinyl alcohol with acetaldehyde. Such a species is, of course, within the scope of this invention.

Included among those polyvinyl acetals which may be employed in this invention may be listed the reaction products of polyvinyl alcohol with formaldehyde (polyvinyl formal), acetaldehyde, propionaldehyde, butyraldehyde (polyvinyl butyral), pentaldehyde, hexaldehyde, heptaldehyde, nonaldehyde, decaldehyde, undecaldehyde, dodecaldehyde, crotonaldehyde, acrolein, benzalehyde, ring substituted benzaldehydes, etc., isomers of the foregoing and mixtures thereof. Polyvinyl formal and polyvinyl butyral have been found to yield coating compositions having optimal physical characteristics and, in addition, have the advantage of being readily available on a commercial scale. Of the two, considering physical properties, polyvinyl butyral is the more preferred.

Where a polyvinyl butyral resin is employed in the practice of this invention it may have a vinyl alcohol content of from about 5 to about 30 weight percent and a residual acetate content of less than about 10 weight percent, based on the total resin weight. Especially preferred are polyvinyl butyrals with a vinyl alcohol content of from about 14 to about 22% and a residual acetate content of from about 1.0 to about 5.0%. The weight average molecular weight of the polyvinyl butyral may vary from about 25,000 to about 250,000 with a preferred range of about 25,000 to about 50,000.

Where a polyvinyl formal resin is employed in the practice of this invention it may have a vinyl alcohol content of from about 5 to about 15 weight percent and a residual acetate content of less than about 50 weight percent. Especially preferred are polyvinyl formals with a vinyl alcohol content of from about 5 to about 7% and a residual acetate content of from about 9 to about 30%. The weight average molecular weight of the polyvinyl formal may vary from about 10,000 to about 50,000 with a preferred range of about 16,000 to about 34,000.

A second component of the coating compositions of this invention is an interpolymer having at least one alcoholic-hydroxyl-containing residue and a styrene residue selected from the group consisting of styrene, substituted styrenes and mixtures thereof, an ester of such interpolymer and/or an adduct of such ester. The alcoholic-hydroxyl-containing residue may, for example, be allyl alcohol, methallyl alcohol, chloroallyl alcohol, a hydroxy-alkyl ester such as beta hydroxy-ethyl fumarate, hydroxymethyl maleate, hydroxyethyl acrylate and the like. The preferred hydroxyl-containing residue is allyl alcohol. Mixtures may also be employed. Further, these alcohol groups may be generated after polymerization, for example, by reduction of a styrene-acrolein copolymer. Preferably, they will be formed by the interpolymerization of styrene with an alcoholic-hydroxyl-containing monomer.

For purposes of brevity and simplicity these interpolymers will be referred to as styrene-alcohol interpolymers, although, as will be seen, numerous specific substitutions may be made in the actual monomeric make-up while remaining within the scope of this invention.

The styrene-alcohol interpolymer will, in actual practice, most probably be an interpolymer of styrene and allyl alcohol due to the ready availability of these monomers. However, it has been found that the styrene moiety present in the interpolymers employed herein may be replaced, with equivalent results being obtained, by substituted styrenes such as, for example, alpha-alkyl styrenes, e.g., alpha-methyl styrene, alpha-ethyl styrene, etc.; ring-substituted alkyl styrenes, e.g., ortho-, meta- and paramethyl, ethyl butyl, etc., styrenes, 2,3- and 2,4-dimethyl and diethyl styrenes; halo styrenes, e.g., mono-, di- and trichlorostyrenes, alpha-chloro styrene, 2,4-dibromostyrene, etc.; haloalkyl styrenes, e.g., 4-chloro-alphamethyl styrene, 2-bromo-4-methyl styrene, etc. Mixtures of such styrene monomers may be present in combined form in the interpolymer employed, if desired.

While the prior art, as exemplified by U.S. Pats, 2,588,890; 2,630,430; 2,894,938 and 2,940,946, quite adequately describes styrene-allyl alcohol copolymers and methods for their preparation, in a preferred embodiment interpolymers containing from about 5.0 to 8.0 weight percent of hydroxyl groups have been found to provide superior results and are employed. In a further preferred embodiment, the relatively homogeneous interpolymers prepared as taught in U.S. Pat. 2,940,946 are employed.

The unsaturated esterified interpolymers of this invention are esters of the aforementioned styrene-alcohol interpolymer with at least one unsaturated mono- or polycarboxylic acids. As examples of such acids may be listed acrylic acid, methacrylic acid, propenoic acid, butenoic acid, pentenoic acid, crotonic acid, sorbic acid, maleic acid, fumaric acid, glutaconic acid and the like.

It is preferred that the esterified interpolymers of this invention be formed from natural or synthetic fatty acids and/or derivatives and/or mixtures thereof, such as phenyl stearic acid or ring-substituted benzoic acids.

The most preferred esterified interpolymers of this invention are interpolymers of from 60–85% by weight of styrene monomer and, correspondingly, from 40 to 15% by weight of the alcohol wherein from 50 to 75% of the hydroxyl groups thereof are esterified with the unsaturated fatty acid.

The unsaturated fatty acids with which the aforementioned styrene-allyl alcohol interpolymers are esterified are most preferably those containing from 10–24 carbon atoms. Examples of suitably unsaturated fatty acids include $\Delta^{9,10}$ decylenic acid, $\Delta^{9,10}$ dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc. Mixtures of such fatty acids may also be employed. Especially preferred are the mixtures of such unsaturated fatty acids as are obtained by the hydrolysis of drying and semi-drying oils such as acorn oil, beechnut oil, brazil nut oil, chaulmoogra oil, corn oil, cotton seed oil, croton oil, hemp seed oil, linseed oil, oiticica oil, perilla oil, poppy seed oil, sesame oil, soybean oil, safflower oil, sunflower oil, tall oil, tung oil, walnut oil, dehydrated castor oil, etc.

The esterified resins are usually prepared by co-reacting an unsaturated fatty acid and a styrene-alcohol interpolymer until from 50–75% of the hydroxyl groups of the copolymer are esterified. This may be accomplished by employing a proportion of unsaturated fatty acid substantially stoichiometrically equivalent to the proportion of hydroxyl groups desired to be esterified. The necessary proportions may be readily determined by a chemist from quantitative analysis data expressed in milliequivalents of carboxyl and hydroxyl groups per unit weight of unsaturated fatty acid and styrene-alcohol copolymer, respectively.

The esterification reaction, in detail, may be effected to the desired degree of esterification at temperatures of from 160° C. to about 225° C. without significant destruction of hydroxyl groups. However, prolonged heating at higher temperatures is apt to result in a loss of hydroxyl groups from the interpolymer. Thus, it is preferred to avoid the use of reaction temperatures above about 225° C. although temperatures of up to about 325° C. may be employed if desired. The reaction may be terminated short of completion merely by ceasing to heat, by quenching, or by other conventional techniques. The esterification may be conducted in the presence of an inert hydrocarbon solvent such as xylene, mineral spirits, etc. However, the use of solvent is optional since the esterification proceeds satisfactorily in the absence of solvent.

Any ethylenically unsaturated carboxylic acid, anhydride, or a partial ester thereof containing the structure:

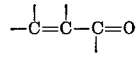

may be employed in forming the adducts of this invention. Anhydrides are preferably employed. However, to avoid redundancy the term "acid" as hereinafter employed in naming specific examples of useful compounds and in otherwise referring to these compounds shall be understood to include and refer to the corresponding anhydride where possible as well as to the partial esters. Thus, in place of the maleic and fumaric acids one may employ, with equivalent results, monocarboxylic acids such as, for example, acrylic acid, methacrylic acid, crotonic acid, isocrotonic acid, vinyl acetic acid, ethacrylic acid, dimethyl acrylic acid, teracylic acid, angelic acid, tiglic acid, etc. and polycarboxylic acids such as, for example, itaconic acid, citraconic acid, chloromaleic acid, mesaconic acid, aconitic acid, etc.

In the case of polycarboxylic acids, the partial, e.g., not exceeding one-half, esters thereof with 1–10 carbon atom alcohols may be employed. Examples thereof include mono-methyl maleate, mono-butyl fumarate, mono-butyl maleate, mono-decyl maleate, mono-benzyl maleate, etc.

In preparing the preferred adducts of this invention, the esterified styrene-allyl alcohol interpolymer and the ethylenically unsaturated carboxylic acid are combined in a suitable reaction vessel, preferably equipped with a reflux condenser and means for charging materials during reaction. Adduction is effected at temperatures of from about 50° C. to reflux, and more preferably at from about 100° C. to reflux, until substantially all of the ethylenically unsaturated carboxylic compound has been consumed. The presence of an organic solvent during adduction does not interfere except insofar as the particular solvent employed may not, at the reaction pressure employed, permit the reaction temperature to approach reaction conditions or maintain the reactive materials in a physical state permitting effective co-reaction.

Although not necessary to the practice of this invention, it has been found advantageous to effect the adduction in the presence of a small proportion of iodine; for example, up to about 2 weight percent based upon the total weight of esterified styrene-allyl alcohol interpolymer and ethylenically unsaturated carboxylic acid. The function of the iodine during adduction is to lighten the color of the resulting product and also to depress the molecular weight of the product so as to retain a lower viscosity and avoid gelation. This function is unusual in this art since the normal use of iodine is to catalyze reaction with conjugated unsaturation. In the systems of this invention, however, there may be very little, if any, conjugation. Thus, while no iodine need be employed, it has been found that the adducted product contains a level of color which may be found to be objectionable in certain instances. More importantly, however, when iodine is not used, the adduction reaction should be more carefully controlled so as to avoid gelation. The use of too much iodine, on the other hand, has been found to decrease the chemical, or hydrolysis, resistance of films prepared from the adducted product. Generally, the iodine is predispersed in a solvent and charged to the reaction system along with the ethylenically unsaturated carboxylic acid, but may be added during the adduction reaction, if desired, with some sacrifice in efficiency.

As heretofore mentioned, the adduction reaction may be effected in the optional presence of a non-reactive organic solvent. Generally, up to 10% by weight, based upon total solids, of an organic solvent will provide a suitable reaction mixture. However, as aforesaid, significantly more solvent may be employed if desired. Virtually any of the conventional non-reactive solvents, e.g., varsol, xylol, toluene, isobutyl ketone, etc., may be employed.

The polyvinyl acetal and the styrene-alcohol interpolymers, esters and/or adducts thereof may be advantageously blended in weight ratios of from 95/5 to 5/95, inclusive. A preferred range is 80/20 to 20/80; inclusive. For optimum adhesion, workability, impact resistance and resistance to salt water and salt spray, it is preferred that the styrene-alcohol interpolymer, ester or adduct portion account for 50–75% of the weight of the total resin.

Where the coating compositions of this invention are to be applied to metal surfaces the addition thereto of chromium trioxide and water to form chromic acid will be found desirable and advantageous from the point of view of ensuring good adhesion, water resistance and corrosion protection. In general, concentrations of about 0.5 to about 3% by weight based upon the weight of the polyvinyl acetal will be employed although, under some circumstances, higher concentrations will be found to be advantageous.

Where it is desired that the coating compositions of this invention exhibit weldability, it will usually be desirable to incorporate as a conductive pigment a finely divided metal. Metals which may be employed include aluminum, cadmium, zinc, manganese, magnesium, chromium, etc. and mixtures thereof. Of these, aluminum is the most preferred.

When aluminum powder is employed in the practice of this invention, it should be finer than 100 mesh in order to insure good dispersion throughout the resin solution. The aluminum serves as a conductive coating through which an arc can be struck and serves to make the coating composition weldable. It also functions as a good deoxidizer and welding flux and aids in imparting weathering resistance to the coating.

The coating compositions of this invention will generally be applied from solution and/or dispersion in organic solvents. The solvent or solvents to be used should not be corrosive to metal plate or react adversely with any of the other ingredients in the coating composition. Examples of suitable solvents include. 1/1 xylene/ethanol; 47.5/47.5/5.0 toluene/butanol/cyclohexanone; 51/34/15 toluene/butanol/ethylene glycol monomethyl ether; 1/1 isopropanol/toluene. Especially preferred is a solvent blend of 1/1 toluene/n-butanol.

The following examples are presented in illustration of the invention and are not intended as limitations thereof. Where parts are mentioned, parts by weight are intended unless otherwise described.

EXAMPLE I

Part A

A one liter flask is equipped with a stirrer, a thermometer, a water condenser and a trap filled with xylene. 300 grams of a copolymer comprised of about 70% by weight of styrene and, correspondingly, a thoretical 30% by weight of allyl alcohol, but having an actual hydroxyl group content of about 6.4% by weight, are charged thereto together with 240 grams of soya fatty acids and 30 grams of xylene. The mixture is gradually heated to reflux (about 160° C.) and then to about 225° C. over a period of one hour and is maintained thereat for an additional hour. About 30 ml. of mixed water and xylene are removed from the trap. The batch temperature is then increased, over a 45 minute period, to about 300° C. and is maintained thereat for an additional two hours. A fused esterified resin wherein approximately 75% of the hydroxyl groups have been esterified is obtained in conjunction with sufficient free soya fatty acids to provide an acid number of about 3.

Part B 10.22 parts of the product of Part A containing 95.5% solids is added to a mixing kettle containing 39.78 parts of n-butanol and 39.78 parts of toluene. This addition is carried out under agitation of moderate intensity, and the agitation is continued throughout the process. 10.22 parts of polyvinyl butyral is slowly added to the agitator vortex. The resulting solution has a theoretical solids of 19.5% and a viscosity in the range of from 50–100 centipoises.

Part C

To 69 parts of the product of Part B is added 0.14 part of chromium trioxide dissolved in 2.76 parts of water. This addition is made slowly with good agitation. Continuing the agitation, 2.37 parts of aluminum powder is added, followed by 0.12 part of a 6% cobalt drier. The resulting mixture has a theoretical solids of 21% and a viscosity of 170 centipoises.

EXAMPLE II

Control

For the purpose of comparison, a weldable coating composition similar to the composition of Example I, Part C, is prepared, except that no styrene-allyl alcohol ester is added. This coating composition is prepared by dissolving 13.2 parts of polyvinyl butyral in 59 parts of isopropanol and 59 parts of toluene. 7.8 parts of water is also added. Next, 0.164 part chromic acid pre-dissolved in 2.6 parts of water is introduced with agitation. Finally, 2.4 parts of aluminum powder is added.

EXAMPLE III

Part A

The coating compositions of Example I, Part C, and Example II, along with a commercially available single package epoxy zinc rich primer and a commercially available epoxy-polyamide two-package zinc rich weldable primer are each applied to one clean steel panel and one steel panel which has been wiped with oil. The eight panels thus prepared are exposed to salt fog for 250 hours, than are removed and tested for blistering, corrosion and adhesion. The results are shown in Table I.

TABLE I.—SALT FOG EXPOSURE (250 HRS.)

| Coating | Substrate | Percent blister | Corrosion (10 best) | Adhesion |
|---|---|---|---|---|
| Example I, Part C | Clean | 0 | 9 | Very good. |
|  | Oily | 0 | 8 | Do. |
| Example II | Clean | 0 | 8 | Clean. |
|  | Oily | 2 | 8 | Fair. |
| Epoxy-zinc | Clean | 3 | 0 | Very poor. |
|  | Oily | 10 | 0 | Do. |
| Epoxy-polyamid-zinc | Clean | 1 | 7 | Very good. |
|  | Oily | 1 | 7 | Do. |

Part B

The same procedure is followed as in Part A except that the panels are immersed in water for 250 hours. The results of this test are shown in Table II.

TABLE II.—WATER IMMERSION (250 HRS.)

| Coating | Substrate | Percent blister | Corrosion (10 best) | Adhesion |
|---|---|---|---|---|
| Example I, Part C | Clean | 0 | 9 | Excellent. |
|  | Oily | 0 | 9 | Do. |
| Example II | Clean | 1 | 9 | Very poor. |
|  | Oily | 1 | 9 | Do. |
| Epoxy-zinc | Clean | 0 | 0 | Do. |
|  | Oily | 0 | 0 | Do. |
| Expoxy-polyamide-zinc | Clean | 0 | 7 | Excellent. |
|  | Oily | 0 | 7 | Do. |

The above results clearly show the superiority of the coatings of the present invention, i.e. the composition of Example I, Part C.

EXAMPLE IV

Example I is repeated using the tall oil ester of the styrene-allyl alcohol copolymer in place of the soya ester. Equally good results are achieved.

EXAMPLE V 14 parts of polyvinyl butyral and 6 parts of the 41% soya ester of a styrene-allyl alcohol copolymer are dissolved in a mixture of 40 parts toluene and 40 parts n-butanol. When the resins are dissolved, 0.1 part chromium trioxide dissolved in 5.1 parts of water is added with good agitation. Next, 3.4 parts of aluminum powder and 0.1 part of a 6% cobalt drier are stirred in. The composition thus prepared is sprayed onto a steel test panel, permitted to air dry overnight, and then baked for 30 minutes at 300° F. The resulting film has a pencil hardness of HB and withstands a reverse impact of 80 inch-pounds. After 10 days immersion in a 5% salt solution, the adhesion and gloss of the film are found to be good and there is no blistering.

EXAMPLE VI

Example V is repeated except that 4 parts of polyvinyl butyral and 16 parts of the copolymer ester are used. The drier concentration is also increased to 0.27 part. The film has a pencil hardness of B and withstands a reverse impact of 160 inch-pounds. After 10 days immersion in a 5% salt solution, the adhesion and gloss are both good and there is no blistering.

EXAMPLE VII

Part A

Preparation of a linseed fatty acid ester of a styrene-allyl alcohol copolymer containing about 52% by weight, based upon total solids, of linseed fatty acids: Charge 1630 parts of linseed fatty acids, 1500 parts of a styrene-allyl alcohol copolymer containing about 5.8 weight percent of hydroxyl groups and 120 parts of xylol to a reaction kettle equipped with a stirrer and a trap-condenserazetrope set-up. The reaction mixture is heated according to the following schedule:

| | Temperature, °C. | Comments |
|---|---|---|
| Minutes: | | |
| 0 | 20 | All ingredients charged. |
| 80 | 110 | Azetrope starts. |
| 105 | 200 | 33 parts water over. |
| 165 | 238 | 76 parts water over. |
| 295 | 265 | 97 parts water over. |
| 495 | 260 | 100 parts water over. |
| Cool. | | |

Part B

Preparation of a maleinized adduct of the linseed ester prepared in Part A of this Example VII: Charge the product of Part A together with 242.4 parts of maleic anhydride to a flask equipped with a stirrer and reflux condenser. The reaction mixture is heated according to the following schedule:

| | Temperature, °C. | Comments |
|---|---|---|
| Minutes: | | |
| 0 | 20 | Ester in. |
| 15 | 85 | Maleic anhydride added. |
| 95 | 225 | |
| 275 | 225 | |
| Cool. | | |

The total solids content of the product is 98.9% and the acidity is 0.980 meq./gm.

EXAMPLE VIII

Twenty parts of the product of Example VII, Part B are dissolved in a mixture of 80 parts of toluene and 80 parts n-butanol. Twenty parts of polyvinyl butyral are further dissolved therein and the solution is applied to a steel test panel. When dry, the resulting film is clear and hard and its adhesion is even better than that of a blend of the same polyvinyl butyral with a non-adducted ester.

EXAMPLE IX

Part A

Prepare a 10% solids solution by dissolving in 90 parts of dimethyl foramide 10 parts of the soya ester of Example I, Part A.

Part B

Prepare a 10% solids solution by dissolving in 90 parts of dimethyl formamide 10 parts of a polyvinyl butyral of weight average molecular weight in the range 30,000–34,000, and having about 80 weight percent vinyl butyral content, about 18.0–20.0 weight percent vinyl alcohol content and the remainder, vinyl acetate.

Part C

Blend one part of the solution of Part A with nine parts of the solution of Part B. The solution obtained thereby is clear.

Part D

By means of a doctor blade having a 9 mil opening, cast a film of the solution blend of Part C upon a glass plate. Air dry the film at room temperature for one hour and then bake at 250° F. for 30 minutes. The resulting film is clear and has a pencil hardness of 4H.

EXAMPLE X

Example IX is repeated except that nine parts of the solution of Part A is blended with one part of the solution of Part B. The solution is again clear. The baked film is only slightly cloudy and has a pencil hardness of 5H.

EXAMPLE XI

Example IX is repeated except that a 70/30 styrene/allyl alcohol copolymer is substituted for the copolymer ester of Part A. Upon blending with the polyvinyl butyral resin solution of Example IX, Part B, a clear solution blend is again obtained. The baked film is clear and has a pencil hardness of 4H.

EXAMPLE XII

Example X is repeated except that a 70/30 styrene/allyl alcohol copolymer is substituted for the copolymer ester, as in Example XI. A clear solution yielding clear baked films of pencil hardness 5H is the result.

EXAMPLE XIII

Example IX is repeated except that a polyvinyl formal resin of weight average molecular weight in the range 26,000–34,000, hydroxyl content 5.5–7.0 weight percent, acetate content of 22–30 weight percent and formal content of 63–70 weight percent is substituted for the polyvinyl butyral in Part B. The clear solution resulting from the blending with the soya ester solution yields clear films having a pencil hardness of 6H.

EXAMPLE XIV

Example IX is repeated except that a 70/30 copolymer of styrene/allyl alcohol is substituted for the soya ester of Part A and a polyvinyl formal of weight average molecular weight in the range 16,000–20,000, about 6 weight percent hydroxyl content, 12 weight percent acetate content and 82 weight percent formal content is substituted for the polyvinyl butyral of Part B.

The clear solution thus obtained yields a baked film that, while cloudy, has a pencil hardness of 4H.

EXAMPLE XV

Example XIV is repeated except that nine parts of styrene/allyl alcohol copolymer solution is blended with one part of polyvinyl formal solution. The same results are obtained.

It is obvious, of course, that various additives such as pigments, dyes, fillers, extenders, wetting agents, and the like may be added to these compositions without departing from the scope of the invention. Small quantities of a conventional drier such as cobalt octoate, cobalt naphthenate, manganese naphthenate, lead naphthenate, or others based upon zinc, calcium, nickel, zirconium, cerium or mixtures thereof, may be employed, if desired, to improve the drying characteristics of films cast from these resins. The films may be employed to protect the surfaces of such commercial products as automobiles, appliances, architectural structures, etc., as well as non-fabricated materials such as sheets, tubes, rods, etc.

Applications of the coatings may be accomplished by conventional methods, e.g. brushing, spraying, dipping, etc.

It is obvious that many variations may be made in the products and methods set forth above without departing from the spirit and scope of this invention.

What is claimed is:

1. A coating composition comprising a polymeric blend comprising::
   (A) about 5 to about 95% by weight of at least one polyvinyl acetal, and, correspondingly,
   (B) about 95 to about 5% by weight of an interpolymer selected from the group consisting of:
      (1) an interpolymer prepared from an ethylenically unsaturated alcohol and a styrene monomer, wherein
         (a) the ethylenically unsaturated alcohol is selected from the group consisting of allyl alcohol, methallyl alcohol, chloroallyl alcohol and mixtures thereof, and
         (b) the styrene monomer is selected from the group consisting of styrene, substituted styrenes and mixtures thereof,
      (2) a fatty acid ester of the interpolymer of part (1) wherein the fatty acid moiety of the ester is selected from the group consisting of unsaturated fatty acids containing 10–24 carbon atoms and mixtures thereof, (3) an adduct of the ester of part (2) with at least one alpha, beta-ethylenically unsaturated carboxylic compound and (4) mixtures thereof.

2. The coating composition of claim 1 further containing about 10% to about 50% by weight of aluminum powder of finer than 100 mesh, based on the weight of the total resin.

3. The coating composition of claim 1 further containing about 0.5% to about 3% by weight chromium trioxide, based on the weight of polyvinyl acetal.

4. The coating composition of claim 1 further containing about 10% to about 50% by weight of aluminum powder of finer than 100 mesh, based on the weight of the total resin.

5. The coating composition of claim 1 incorporated into at least one non-corrosive organic liquid which is a solvent for each component of the polymeric blend.

6. A coating composition comprising a polymeric blend comprising:

(A) about 5 to about 95% by weight polyvinyl butyral and, correspondingly, (B) about 95 to about 5% by weight of a fatty acid ester of a copolymer of an ethylenically unsaturated alcohol and a styrene monomer, said esterified copolymer being a copolymer of:

(1) an ethylenically unsaturated alcohol selected from the group consisting of allyl alcohol, methallyl alcohol and mixtures thereof, and (2) a styrene monomer selected from the group consisting of styrene, ring-substituted mono- and di-, alkyl-, chloro- and chloroalkyl styrenes and mixtures thereof, wherein said copolymer, before esterification, has a hydroxyl group content of from about 4–7.5% by weight; from 50–75% of said hydroxyl groups being esterified with fatty acid selected from the group consisting of unsaturated fatty acids containing from 10–24 carbon atoms and mixtures thereof as obtained from the hydrolysis of drying and semi-drying oils.

7. The coating composition of claim 6 further containing about 10% to about 50% by weight of aluminum powder of finer than 100 mesh, based on the weight of the total resin.

8. The coating composition of claim 6 further containing about 0.5% to about 3% by weight chromium trioxide, based on the weight of the polyvinyl butyral.

9. The coating composition of claim 8 further containing about 10% to about 50% by weight of aluminum powder of finer than 100 mesh based on the weight of the total resin.

10. The coating composition of claim 6 wherein the fatty acid ester of the copolymer is the soya ester.

11. The coating composition of claim 6 wherein the ester of the copolymer is the tall oil ester.

References Cited

UNITED STATES PATENTS

| | | | |
|---|---|---|---|
| 2,588,890 | 3/1952 | Shokal et al. | 260—88.1 |
| 2,630,430 | 3/1953 | Shokal et al. | 260—88.1 |
| 3,055,865 | 9/1962 | Craig | 260—88.1 |
| 3,322,855 | 5/1967 | Fukushima et al. | 260—874 |
| 3,325,432 | 6/1967 | Kellert et al. | 260—29.6 |
| 3,357,936 | 12/1967 | Zimmerman et al. | 260—22 |
| 3,471,589 | 10/1969 | Rinehart | 260—839 |

DONALD E. CZAJA, Primary Examiner

R. W. GRIFFIN, Assistant Examiner

U.S. Cl. X.R.

117—124, 132, 161, 168; 260—33.4, 33.6, 41, 874